United States Patent
Hess et al.

(10) Patent No.: US 8,612,182 B2
(45) Date of Patent: Dec. 17, 2013

(54) METHODS AND SYSTEMS FOR ISOLATING A FREQUENCY IN A ROTATING MACHINE

(75) Inventors: Dustin Delany Hess, Minden, NV (US); Charles Terrance Hatch, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 661 days.

(21) Appl. No.: 12/759,360

(22) Filed: Apr. 13, 2010

(65) Prior Publication Data

US 2011/0251804 A1    Oct. 13, 2011

(51) Int. Cl.
G01R 23/10  (2006.01)
H03F 1/26   (2006.01)
H04B 15/00  (2006.01)

(52) U.S. Cl.
USPC ............ 702/190; 702/56; 702/66; 702/76; 702/77

(58) Field of Classification Search
USPC ............................. 702/56, 66, 76, 77, 190
See application file for complete search history.

(56) References Cited

U.S. PATENT DOCUMENTS

| | | | |
|---|---|---|---|
| 4,669,315 A | 6/1987 | Sato et al. |
| 4,843,885 A | 7/1989 | Bambara |
| 6,053,047 A | 4/2000 | Dister et al. |
| 6,289,735 B1 | 9/2001 | Dister et al. |
| 6,668,220 B2 | 12/2003 | Remboski et al. |
| 6,681,634 B2 | 1/2004 | Sabini et al. |
| 6,925,879 B2 | 8/2005 | Raichle |
| 7,006,953 B2 | 2/2006 | Takemura et al. |
| 7,539,549 B1 | 5/2009 | Discenzo et al. |

*Primary Examiner* — Janet Suglo
(74) *Attorney, Agent, or Firm* — Fletcher Yoder, P.C.

(57) ABSTRACT

A method of isolating a frequency in a rotating machine having at least one sensor includes receiving, from the at least one sensor, a sensor signal that includes at least one frequency, converting the sensor signal to a digital vibration signal, modifying the vibration signal to generate an envelope signal, synchronously oversampling the envelope signal to generate a synchronous envelope signal, and transforming the synchronous envelope signal into a frequency spectrum to isolate the frequency.

20 Claims, 3 Drawing Sheets

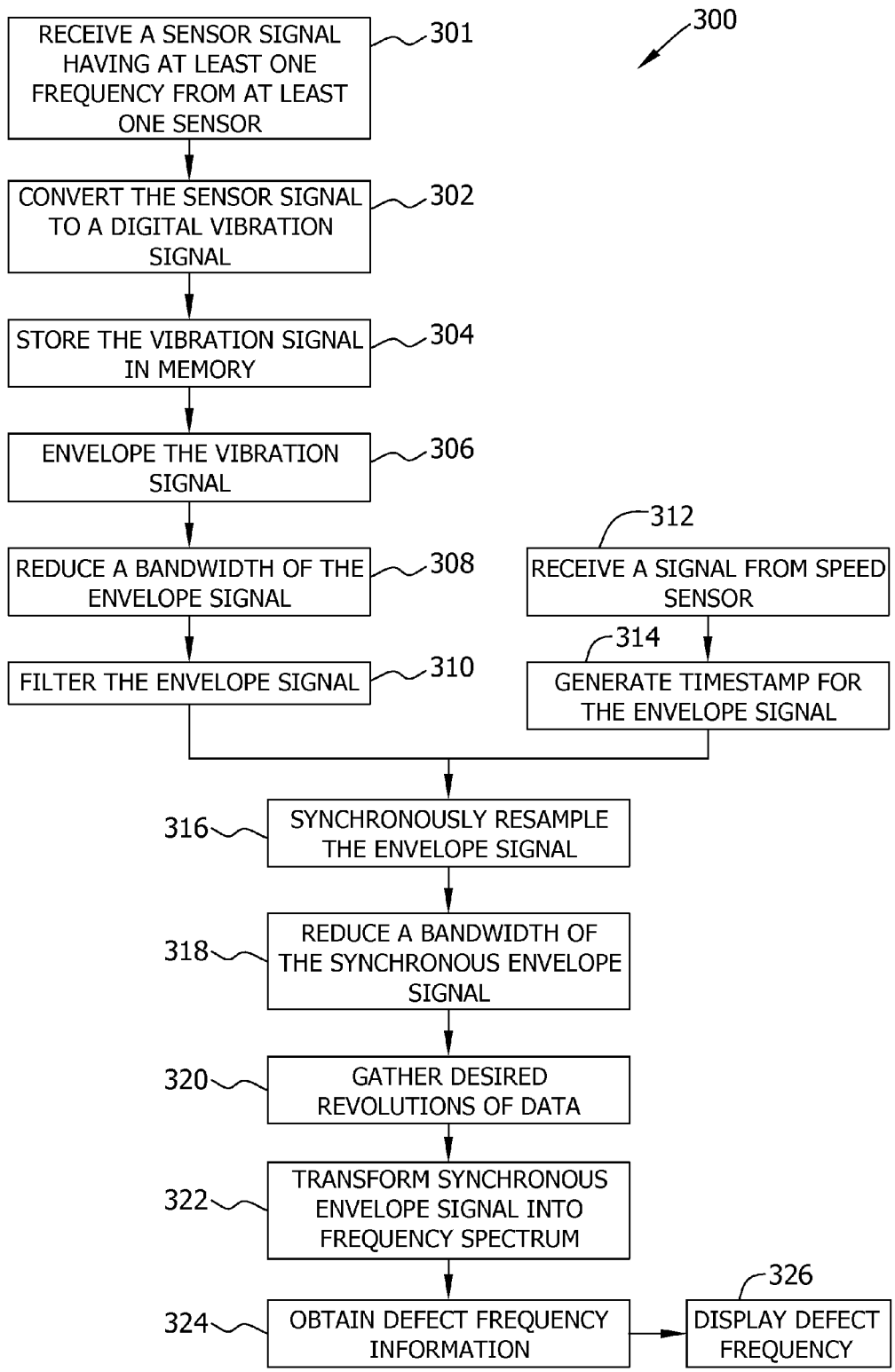

METHODS AND SYSTEMS FOR ISOLATING A FREQUENCY IN A ROTATING MACHINE

BACKGROUND OF THE INVENTION

The present application relates generally to rotating machines and, more particularly, to methods and systems for use in isolating a frequency in a rotating machine.

At least some known rotating machines include one or more drive shafts that drive a load. During operation, a component of the machine, such as a gear or at least one bearing used to support the rotating drive shaft, may develop a flaw or a defect. Over time, continued operation with a "bad" component may cause the component to fail, which may cause degraded performance and/or damage to the machine. To facilitate preventing damage to the machine, such components are commonly monitored to detect performance issues that may be indicative of a component failure or component damage.

At least some known bearing monitoring systems execute an enveloping algorithm on an incoming signal, such as a vibration signal. More specifically, such algorithms enable bearing events to be identified via a transmission of impacts at a carrier frequency. The impacts are typically present in a spectrum with energy at the carrier frequency and with side bands that correspond to desired bearing frequencies. The enveloping process demodulates the signal resulting in a spectrum with energy at the desired bearing frequencies. Such an approach is generally more reliable for a machine that rotates with a constant speed. In contrast, if the machine speed varies, the bearing frequencies directly linked to the speed also vary which generally causes a "smearing" or obscuration of the spectrum. Such smearing clouds the frequencies of interest and makes identifying the bearing events difficult, if not impossible. Moreover, the variable speed may cause the energy to be present in unexpected frequency bins in the spectrum.

BRIEF DESCRIPTION OF THE INVENTION

In one embodiment, a method of isolating a frequency in a rotating machine including at least one sensor is provided that includes receiving, from the at least one sensor, a sensor signal that includes at least one frequency, converting the sensor signal to a digital vibration signal, and modifying the vibration signal to generate an envelope signal. The envelope signal is synchronously oversampled to generate a synchronous envelope signal, and the synchronous envelope signal is transformed into a frequency spectrum to isolate the frequency.

In another embodiment, a monitoring system is provided that includes a machine that includes at least one rotating component, at least one sensor configured to detect a frequency of the at least one rotating component, a memory configured to store data received from the at least one sensor, and a processor. The processor is programmed to receive, from the at least one sensor, a signal including at least one frequency, convert the received signal to a digital vibration signal, and modify the vibration signal to generate an envelope signal. The processor is further programmed to synchronously oversample the envelope signal to generate a synchronous envelope signal, and transform the synchronous envelope signal into a frequency spectrum to isolate the at least one frequency.

In another embodiment, an analysis system is provided that includes a memory configured to store data received from at least one sensor and a processor. The processor is programmed to receive, from the at least one sensor, a signal including at least one frequency, convert the received signal to a digital vibration signal, and modify the vibration signal to generate an envelope signal. The processor is further programmed to synchronously oversample the envelope signal to generate a synchronous envelope signal and transform the synchronous envelope signal into a frequency spectrum to isolate the at least one frequency.

BRIEF DESCRIPTION OF THE DRAWINGS

FIG. 3 is a flow diagram of an exemplary method for use in isolating a frequency from data gathered with the bearing analysis system shown in FIG. 2.

DETAILED DESCRIPTION OF THE INVENTION

Figure 1:
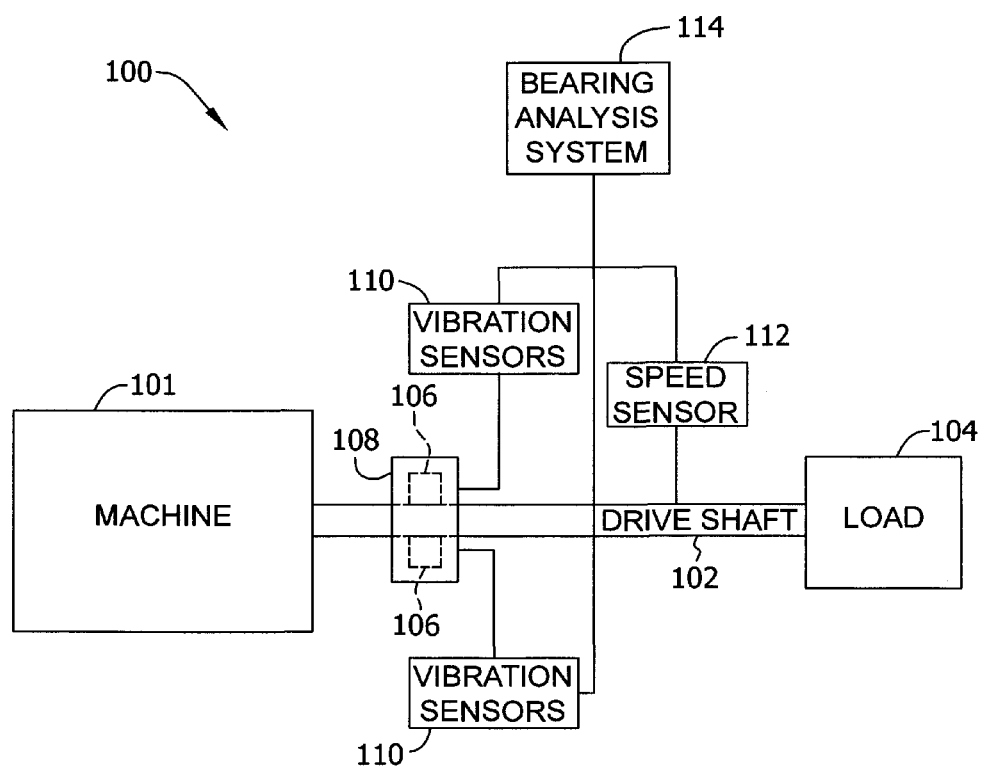
FIG. 1 is a block diagram of an exemplary monitoring system.

FIG. 1 shows an exemplary monitoring system 100 that monitors a rotating machine 101. In the exemplary embodiment, machine 101 is a variable speed machine, such as a wind turbine, a hydroelectric generator, gas turbine, and/or any suitable machine that operates with a variable speed. Alternatively, machine 101 may be a synchronous speed machine. In the exemplary embodiment, machine 101 drives a drive shaft 102 that is coupled to a load 104. Drive shaft 102 is at least partially supported by one or more bearings 106 that are housed within a support structure 108, such as a gearbox. Alternatively, bearings 106 may be housed within load 104, or within any suitable structure that enables bearings 106 to support drive shaft 102.

In the exemplary embodiment, rotation of drive shaft 102 generally causes bearings 106 to rotate in an opposite rotational direction of drive shaft 102. Moreover, bearings 106 are maintained in rotational contact with drive shaft 102 and support structure 108. If one or more bearings 106 develops a crack, spall, or any other defect, such a bearing 106 may oscillate or "ring" (hereinafter referred to as a "ring event") at a natural frequency of bearing 106 when the area of the defect contacts drive shaft 102 and/or support structure 108 during rotation of drive shaft 102. As such, typically one or more ring events occur at a frequency that is proportional to a rotational speed of machine 101.

Ring events generally induce corresponding vibrations into support structure 108 and/or bearings 106. One or more vibration sensors 110, such as accelerometers, detect and measure the ring event vibrations and transmit a signal representative of the vibration measurements to a signal processing system 114 for processing and/or analysis. In the exemplary embodiment, signal processing system 114 is a bearing analysis system. More specifically, each vibration sensor 110 transmits a carrier signal, such as a vibration signal, to signal processing system 114. The vibration signal includes a plurality of frequency components, such as, without limitation, one or more shaft vibration frequencies, and/or one or more noise frequencies. Moreover, the vibration signal may include one or more frequencies, such as one or more bearing defect frequencies. A speed sensor 112 measures a rotational speed of drive shaft 102 and transmits one or more signals that are indicative of the speed measurements, to bearing analysis system 114 for processing and/or analysis. In the exemplary embodiment, speed sensor 112 may be used to measure a rotational speed of drive shaft 102 a plurality of different, equally spaced times during each revolution of drive shaft 102. More specifically, in the exemplary embodiment, speed sensor 112 is an angular encoder that produces an event, or an encoder signal, at equally angularly spaced positions of drive shaft 102. Such events may be used to determine a rotational speed of drive shaft 102. Moreover, in the exemplary embodiment, measurements from vibration sensor 110 and/or any other suitable sensor are acquired, or sampled, synchronously with respect to the events.

Figure 2:
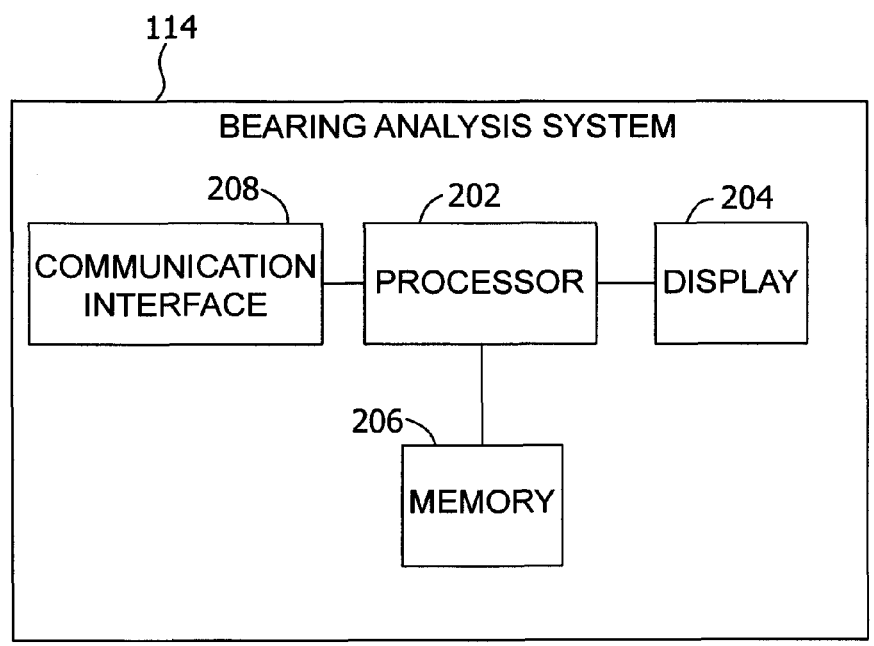
FIG. 2 is a block diagram of an exemplary bearing analysis system that may be used with the monitoring system shown in FIG. 1.

FIG. 2 is a block diagram of an exemplary bearing analysis system 114 that may be used to analyze an operation of machine 101 (shown in FIG. 1). In the exemplary embodiment, system 114 includes a processor 202, a display 204, a memory 206, and a communication interface 208. Display 204, memory 206, and communication interface 208 are each coupled to, and in data communication with, processor 202. In one embodiment, at least one of processor 202, display 204, memory 206, and/or communication interface 208 is positioned within a remote system (not shown) that is communicatively coupled to system 114.

Processor 202 includes any suitable programmable system including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor."

Display 204 includes, without limitation, a liquid crystal display (LCD), a cathode ray tube (CRT), a plasma display, and/or any suitable visual output device capable of displaying graphical data and/or text to a user.

Memory 206 includes a computer readable medium, such as, without limitation, a hard disk drive, a solid state drive, a diskette, a flash drive, a compact disc, a digital video disc, random access memory (RAM), and/or any suitable storage device that enables processor 202 to store, retrieve, and/or execute instructions and/or data. Memory 206 may include one or more local and/or remote storage devices. In one embodiment, memory 206 stores data from vibration sensor 110 and/or speed sensor 112 (both shown in FIG. 1), such as one or more values of a vibration signal and/or a speed signal.

Communication interface 208 may include, without limitation, a network interface controller (NIC), a network adapter, a transceiver, and/or any suitable communication device that enables system 114 to operate as described herein. Communication interface 208 may connect to a network (not shown) and/or to one or more data communication systems using any suitable communication protocol, such as a wired Ethernet protocol or a wireless Ethernet protocol.

In the exemplary embodiment, processor 202 executes instructions and/or accesses data stored in memory 206 to analyze and/or process measurements and/or signals from one or more vibration sensors 110 and/or speed sensors 112 (both shown in FIG. 1). Processor 202 receives the signals indicative of the sensed measurements and isolates a frequency, as described in more detail below.

FIG. 3 is a flow diagram of an exemplary method 300 of isolating a frequency within a carrier signal. In the exemplary embodiment, method 300 is executed by system 114 (shown in FIG. 2) or by any other suitable system that enables a frequency to be identified as described herein. In the exemplary embodiment, instructions and/or data for method 300 are stored in a computer readable medium, such as memory 206 (shown in FIG. 2), and the instructions are executed by processor 202 (shown in FIG. 2) to perform the steps of method 300.

System 114 and/or processor 202 receives 301 a sensor signal having at least one frequency from at least one sensor. For example, an asynchronous analog vibration signal from vibration sensor 110 (shown in FIG. 1) may be received 301. Alternatively, system 114 and/or processor 202 may receive any suitable signal from vibration sensor 110. The received 301 signal is then converted 302 to a digital vibration signal that is stored 304 in memory 206 for at least one revolution of machine 101 (shown in FIG. 1), i.e., until drive shaft 102 (shown in FIG. 1) has rotated through one revolution. After the vibration signal has been stored 304 in memory 206, that signal is then modified by enveloping, or demodulating 306, the signal using a suitable enveloping algorithm. In one embodiment, when the vibration signal is enveloped 306, the signal may be high-pass filtered, band-pass filtered, low-pass filtered, rectified, and/or smoothed during the demodulation process.

When the vibration signal is enveloped 306, one or more high frequency components of the original vibration signal are removed and an envelope signal that has a lower frequency than a frequency of the original vibration signal is produced. If the vibration signal includes one or more bearing defect frequencies, the envelope signal includes one or more amplitude peaks that may repeat at a bearing defect repetition frequency. In the exemplary embodiment, the bearing defect repetition frequency is proportional to or approximately equal to the rotational frequency of drive shaft 102. As drive shaft 102 may rotate at a variable speed, the bearing defect repetition frequency may vary throughout each revolution of drive shaft 102 and/or throughout the vibration signal.

A bandwidth of the envelope signal is reduced 308 by a predefined amount based on a predefined bearing bandwidth of interest. In one embodiment, the bandwidth of the envelope signal is reduced 308 by "down-sampling" or by reducing a sampling rate of the envelope signal by the predefined bearing bandwidth of interest. In a specific embodiment, the bandwidth of the envelope signal is reduced 308 by a factor of ten. Alternatively, the bandwidth of the envelope signal may be reduced 308 by any suitable factor or amount that enables bearing defect frequencies to be detected. As such, an amount of memory 206 required to store the envelope signal is reduced.

The envelope signal is filtered 310 using a suitable anti-alias filter to substantially reduce or eliminate aliasing artifacts that may have been introduced into the envelope signal. In one embodiment, a fixed finite impulse response (FIR) filter is used to remove one or more alias frequencies from the envelope signal. Alternatively, any suitable filter is used that enables alias frequencies to be substantially removed from the envelope signal.

System 114 and/or processor 202 also receives 312 one or more signals indicative of speed measurements from speed sensor 112 (shown in FIG. 1). In one embodiment, the speed signals are converted to digital data (i.e., speed data) within system 100. In the exemplary embodiment, system 114 and/or processor 202 uses the speed data to generate 314 one or more timestamps for the envelope signal and/or the vibration signal. Each sample of the envelope signal is correlated with, and timestamped, using the speed data. As such, a current speed of machine 101 is correlated with each sample of the envelope signal.

The timestamped envelope signal is synchronously resampled 316 at a different sampling rate than the envelope signal sampling rate. More specifically, the envelope signal is "oversampled" or resampled at a synchronous sampling rate that is proportional to and greater than the rotational frequency of drive shaft 102. As such, an asynchronous envelope signal is synchronously resampled 316 at a super-synchronous rate with respect to the rotational frequency of drive shaft 102.

Moreover, synchronous resampling 316 is performed after post-processing the vibration signal, i.e., after the vibration signal has been enveloped 306, correlated (or timestamped) with the speed signal, and stored in memory 206. As such, when synchronous resampling 316 is performed, the rotational speed of drive shaft 102 has already been measured by speed sensor 112. The speed of drive shaft 102 does not need to be interpolated, and one or more speed interpolation errors and/or errors related to a filter placement that might otherwise have been introduced into method 300 are reduced or eliminated. The synchronous resampling 316 of the post-processed envelope signal produces a synchronous envelope signal.

The synchronous envelope signal is reduced 318 in bandwidth by down-sampling the synchronous envelope signal at a predefined sampling rate that is lower than the synchronous resampling rate. More specifically, in the exemplary embodiment, a sampling rate for down-sampling the synchronous envelope signal is selected based on the highest defect frequency and/or a harmonic component of the defect frequency to be isolated. More specifically, in the exemplary embodiment, the sampling rate is chosen to be a suitable integer multiple of the defect frequency and/or the defect harmonic frequency. Alternatively, any other suitable sampling rate may be selected that enables system 114 and/or method 300 to function as described herein. As such, an amount of memory 206 required to store the synchronous envelope signal is reduced. While the bandwidth of the synchronous envelope signal is being reduced 318, anti-aliasing is optionally performed to remove aliased frequency components that may have been introduced, as described more fully herein.

A desired number of revolutions of data for the synchronous envelope signal is gathered 320 and stored in memory 206. In the exemplary embodiment, a number of revolutions is gathered 320 that is sufficient to perform a suitable transform, such as a Fast Fourier Transform (FFT), of the synchronous envelope signal. The synchronous envelope signal is transformed 322 into a synchronous frequency spectrum, such as by performing an FFT on the synchronous envelope signal, to facilitate isolating the desired frequency.

The FFT data is analyzed to obtain 324 defect frequency information. More specifically, frequencies, such as bearing defect frequencies, are extracted in a proportional domain, i.e. a domain that identifies frequency components that are proportional to the rotational frequency of drive shaft 102. The defect frequencies appearing in the proportional domain are displayed 326 to a user via display 204 or any suitable display. The defect frequencies are displayed 326 in multiples of the rotational frequency of drive shaft 102 or in any suitable increments.

System 114 and method 300 facilitate extracting bearing defect frequencies from variable speed rotating machines, as compared to known systems that may be limited to extracting frequencies from constant or synchronous speed machines. Known measurement systems use a time-based sampling and processing method to isolate frequencies that may be present in a rotating machine. In contrast, system 114 and method 300 acquire measurements from vibration sensor 110 synchronously with respect to angular positions of drive shaft 102. As such, method 300 is independent of a speed of drive shaft 102. Moreover, in contrast to known systems, system 114 and method 300 do not need to approximate a speed of the machine while a vibration signal is being processed in order to suitably select anti-aliasing filters. Rather, system 114 and method 300 correlate speed measurements with post-processed vibration signal data to facilitate removing any aliasing artifacts that may be introduced during the processing of the vibration signal. Moreover, system 114 and method 300 facilitate reducing an amount of memory that is required to store and process the vibration signal while extracting the bearing frequencies.

A technical effect of the systems and method described herein includes at least one of (a) receiving, from at least one sensor, a sensor signal that includes at least one frequency, (b) converting a sensor signal to a digital vibration signal, (c) modifying a vibration signal to generate an envelope signal, (d) synchronously resampling an envelope signal to generate a synchronous envelope signal, and (e) transforming a synchronous envelope signal into a frequency spectrum to isolate a frequency.

The above-described embodiments provide efficient and cost-effective systems and methods for use in isolating a frequency in a rotating machine. The methods described herein envelope a vibration signal before the signal is processed, and generate enveloped data. The enveloped data is reduced in bandwidth and stored in memory, which reduces an amount of memory used in the method. The enveloped data is correlated with the rotational speed of the machine based on angular positions of a drive shaft of the machine, such that the methods are facilitated to be synchronized with the machine even when the machine speed varies. As such, the methods isolate a frequency, such as a bearing defect frequency, from one or more signals within a variable speed rotating machine.

Exemplary embodiments of methods and systems for isolating a frequency in a rotating machine are described above in detail. The methods and systems are not limited to the specific embodiments described herein, but rather, components of the systems and/or steps of the methods may be utilized independently and separately from other components and/or steps described herein. For example, the methods may also be used in combination with other measuring systems and methods, and are not limited to practice with only the rotating machine as described herein. Rather, the exemplary embodiment can be implemented and utilized in connection with many other power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of isolating a frequency in a rotating machine including at least one sensor, said method comprising:

receiving, from at least one sensor, a sensor signal that includes at least one frequency;

converting the sensor signal to a digital vibration signal;

modifying the digital vibration signal to generate a first envelope signal;

reducing a bandwidth of the first envelope signal before resampling the first envelope signal, wherein reducing the bandwidth of the first envelope signal includes down-sampling;

resampling the first envelope signal at a rate proportional to a rotational frequency of the machine to generate a second envelope signal; and transforming the second envelope signal into a frequency spectrum to isolate the frequency.

2. A method in accordance with claim 1, further comprising filtering the first envelope signal by applying an anti-aliasing filter to the first envelope signal.

3. A method in accordance with claim 1, further comprising reducing a second bandwidth of the second envelope signal.

4. A method in accordance with claim 1, wherein transforming the second envelope signal to a frequency spectrum comprises performing a Fast Fourier Transform of the second envelope signal.

5. A method in accordance with claim 1, further comprising displaying the frequency spectrum in multiples of the rotational frequency of the machine.

6. A method in accordance with claim 5, wherein the machine rotates at a variable speed, said method further comprising correlating a current speed of the machine with the first envelope signal.

7. A method in accordance with claim 6, wherein correlating a current speed of the machine with the sensor signal further comprises generating a timestamp for the first envelope signal.

8. A method in accordance with claim 1, wherein resampling the first envelope signal comprises:

post-processing the first envelope signal; and resampling the post-processed envelope signal to generate the second envelope signal.

9. A method in accordance with claim 1, further comprising receiving machine speed and timestamp information from a speed sensor, wherein the machine speed is correlated with each sample of the first envelope signal.

10. A monitoring system comprising:

a machine comprising at least one rotating component;

at least one sensor configured to detect a frequency of said at least one rotating component;

a memory configured to store data received from said at least one sensor; and a processor programmed to:

receive, from said at least one sensor, a signal including at least one frequency;

convert the received signal to a digital vibration signal;

modify the digital vibration signal to generate a first envelope signal;

reduce a bandwidth of the first envelope signal before resampling the first envelope signal, wherein reducing the bandwidth of the first envelope signal includes down-sampling;

resample the first envelope signal at a rate proportional to a rotational frequency of the machine to generate a second envelope signal; and transform the second envelope signal into a frequency spectrum to isolate the at least one frequency.

11. A monitoring system in accordance with claim 10, further comprising a display, said processor is further programmed to display the frequency spectrum on said display.

12. A monitoring system in accordance with claim 11, wherein said processor is further programmed to display the frequency spectrum in multiples of a rotational frequency of said at least one rotating component.

13. A monitoring system in accordance with claim 10, wherein said processor is further programmed to reduce a bandwidth of the second envelope signal.

14. A monitoring system in accordance with claim 10, wherein said at least one rotating component rotates at a variable speed.

15. A monitoring system in accordance with claim 14, wherein said processor is further programmed to correlate a current speed of said at least one rotating component with the first envelope signal.

16. A monitoring system in accordance with claim 10, wherein said processor is further programmed to:

post-process the first envelope signal; and resample the post-processed envelope signal to generate the second envelope signal.

17. An analysis system, comprising:

a memory configured to store data received from at least one sensor; and a processor programmed to:

receive, from said at least one sensor, a signal including at least one frequency;

convert the received signal to a digital vibration signal;

modify the digital vibration signal to generate a first envelope signal;

reduce a bandwidth of the first envelope signal before resampling the first envelope signal, wherein reducing the bandwidth of the first envelope signal includes down-sampling;

resample the first envelope signal at a rate proportional to a rotational frequency of a machine to generate a second envelope signal; and transform the second envelope signal into a frequency spectrum to isolate the at least one frequency.

18. An analysis system in accordance with claim 17, further comprising a display, said processor is further programmed to display the frequency spectrum on said display.

19. An analysis system in accordance with claim 18, wherein said processor is further programmed to display the frequency spectrum in multiples of a rotational frequency of a drive shaft of a rotating machine.

20. An analysis system in accordance with claim 17, wherein said processor is further programmed to correlate a current speed of a variable speed rotating machine with the first envelope signal.

\* \* \* \* \*